(12) United States Patent
Kooijman

(10) Patent No.: US 8,025,718 B2
(45) Date of Patent: *Sep. 27, 2011

(54) FLUID INLET DEVICE, USE, AND METHOD OF RETROFITTING

(75) Inventor: Hendrik Adriaan Kooijman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 508 days.

This patent is subject to a terminal disclaimer.

(21) Appl. No.: 11/920,615

(22) PCT Filed: May 16, 2006

(86) PCT No.: PCT/EP2006/062354
§ 371 (c)(1),
(2), (4) Date: Nov. 16, 2007

(87) PCT Pub. No.: WO2006/122940
PCT Pub. Date: Nov. 23, 2006

(65) Prior Publication Data
US 2009/0078118 A1    Mar. 26, 2009

(30) Foreign Application Priority Data

May 19, 2005  (EP) ................................... 05104276
Dec. 20, 2005  (EP) ................................... 05112532

(51) Int. Cl.
*B01D 45/00* (2006.01)

(52) U.S. Cl. ................ 95/272; 95/260; 95/262; 95/267; 95/271; 96/204; 96/206; 96/207; 96/209; 96/213; 261/79.1; 261/108

(58) Field of Classification Search .............. 261/79.1, 261/108; 96/198, 204–217; 95/260, 262, 95/267, 271, 272
See application file for complete search history.

(56) References Cited

U.S. PATENT DOCUMENTS

| | | | | |
|---|---|---|---|---|
| 3,938,972 A | | 2/1976 | Sugimura | 55/440 |
| 4,266,603 A | * | 5/1981 | Germann | 165/171 |
| 4,543,108 A | | 9/1985 | Wurz | 55/1 |
| 4,767,424 A | * | 8/1988 | McEwan | 55/329 |

(Continued)

FOREIGN PATENT DOCUMENTS

DE    102004018341    11/2005

(Continued)

OTHER PUBLICATIONS

European International Search Report dated Jul. 5, 2006 for EP patent application No. 05112532.6.

(Continued)

*Primary Examiner* — Duane Smith
*Assistant Examiner* — Thomas McKenzie
(74) *Attorney, Agent, or Firm* — Charles W. Stewart

(57) ABSTRACT

A fluid inlet device (1) suitable for introducing a mixture of liquid and gas into a vessel (5), which fluid inlet device (1) comprises an inlet flow channel having an inlet end (12) for receiving the mixture of liquid and gas; and a plurality of curved guiding vanes (20), wherein each vane (20) comprises an intercepting part (22) extending towards the inlet end of the inlet flow channel, and an outwardly directed deflecting part (25) defining a generally convex side and a generally concave side of the curved vane, wherein the deflecting parts (25) of two consecutive vanes form an outlet channel of the inlet device and define a main direction of gas flow in the outlet channel, and wherein at least one of the vanes (25) is provided with a liquid catcher (40) oblique to the gas flow direction.

21 Claims, 7 Drawing Sheets

U.S. PATENT DOCUMENTS

| | | | |
|---|---|---|---|
| 4,990,167 A | 2/1991 | Stehning | 55/257.1 |
| 5,269,823 A | 12/1993 | Wurz | 55/440 |
| 6,083,291 A * | 7/2000 | Okada et al. | 55/337 |
| 7,276,210 B2 * | 10/2007 | Cerqueira et al. | 422/144 |
| 7,281,702 B2 * | 10/2007 | Jacobs et al. | 261/79.2 |
| 7,459,001 B2 * | 12/2008 | Christiansen et al. | 55/343 |
| 2008/0290532 A1 * | 11/2008 | Kooijman et al. | 261/108 |

FOREIGN PATENT DOCUMENTS

| | | |
|---|---|---|
| EP | 0195464 | 4/1989 |
| GB | 1119699 | 7/1968 |
| WO | WO02074404 | 9/2002 |
| WO | WO03070348 | 8/2003 |
| WO | WO2005018780 | 3/2005 |
| WO | WO2005058503 | 6/2005 |
| WO | WO 2005058503 A1 * | 6/2005 |
| WO | WO2006122940 | 11/2006 |

OTHER PUBLICATIONS

Internals for Packed Columns with No. 22.51.06.40-III.06-50, by Sulzer Chemtech, on p. 18.

* cited by examiner

FLUID INLET DEVICE, USE, AND METHOD OF RETROFITTING

The present application claims priority of European Patent Applications No. 05104276.0 filed 19 May 2005 and 05112532.6 filed 20 Dec. 2005.

FIELD OF THE INVENTION

The present invention relates to a fluid inlet device suitable for introducing a mixture of liquid and gas into a vessel, to the use of such a device, and to a method of retrofitting a fluid inlet device, and to liquid catcher channels.

BACKGROUND OF THE INVENTION

In many installations in the upstream or downstream oil and gas industry, chemical and petrochemical industry, it is required to introduce a mixture of liquid and gas into a processing vessel. The vessel can be a separation vessel designed to separate the stream, e.g. a natural gas stream comprising oil and/or water into liquid and gas streams. The vessel can also be a gas/liquid contacting vessel in which gas and liquid are counter-currently contacted to exchange heat or matter. An example of such a gas/liquid contacting vessel is a fractionation or distillation column, and a particular example is a vacuum distillation column.

In the specification and in the claims the word 'gas' is used to refer to gas and to vapour.

British patent specification No. 1 119 699 discloses a fluid inlet device for introducing a mixture of liquid and gas into a distillation column.

The known fluid inlet device comprises an inlet flow channel having an inlet end for receiving the mixture of liquid and gas, and a plurality of curved guiding vanes placed one behind the other along the inlet flow channel, wherein each vane comprises an intercepting part extending towards the inlet end of the inlet flow channel, and an outwardly directed deflecting part. The intercepting and deflecting parts of each vane are arranged in such a way that the vane intercepts and deflects part of the mixed feed stream, and is capable of effecting a separation between liquid and vapour by inertia and centrifugal force.

During normal operation a mixture of gas and liquid is supplied to the inlet nozzle of a column, which is in fluid communication with the inlet end of the inlet device. The vanes are curved so as to deflect the mixture outwardly. The change in the direction of flow causes a (pre-)separation of the mixture in that liquid is forced onto the concave surface of the vane thereby forming a liquid-rich stream on the concave surface and a gas-rich stream in the remainder of the outlet channel between two vanes. After the streams have left the outlet channel, the liquid-rich stream moves downwards in the column under the influence of gravity, whereas the gas-rich stream flows upwards in the column. In a specific embodiment of the known device a liquid catching channel is arranged at the trailing rim of the vane perpendicular to the main flow direction along the vane. This channel serves to discharge all of the liquid that is separated by the vane sideways, i.e. perpendicular to the main flow direction.

An important parameter of a separating flow inlet device is the total remaining liquid entrainment in the gas, i.e. the remaining liquid content of the gas flowing upwards. Part of the liquid content is due to the incomplete separation in the inlet device. Another part, however, is due to re-entrainment of liquid that had already been separated, which re-entrainment occurs generally in the region where gas and liquid streams leave the inlet device.

Re-entrainment is a general concern, including in distillation and separation applications, since it presents a larger liquid load to downstream equipment. Re-entrainment lowers the overall separation efficiency of the inlet device, since liquid that was already separated on the concave side of the vane, and that should ideally find its way towards the bottom of the vessel, is still carried upwardly with the gas.

Generally, re-entrainment is expected to increase at high velocities, which are e.g. the consequence of minimization of vessel size in view of cost and area occupied, e.g. on an offshore installation.

Although the known fluid inlet device has been successfully applied since its invention, it is desired to be able to operate with lower entrainment and therefore better overall separation efficiency than presently possible.

SUMMARY OF THE INVENTION

In accordance with the present invention there is provided a fluid inlet device suitable for introducing a mixture of liquid and gas into a vessel, which fluid inlet device comprises an inlet flow channel having an inlet end for receiving the mixture of liquid and gas; and a plurality of curved guiding vanes placed one behind the other along the inlet flow channel, wherein each vane comprises an intercepting part extending towards the inlet end of the inlet flow channel, and an outwardly directed deflecting part having a trailing end extending between longitudinal rims, wherein the curved vane has a generally convex side and a generally concave side, wherein the deflecting parts of two consecutive vanes form an outlet channel of the inlet device, and wherein at least one of the vanes is provided along at least part of one or both longitudinal rims of its deflecting part with a liquid catcher channel.

Applicant has realized that a significant mechanism of re-entrainment of already separated liquid into gas occurs at the rims of the known vane, in particular at the trailing end of the deflecting part of the vane.

This re-entrainment is caused by gas flowing across a rim, where a liquid film is present on the vane and/or from which rim liquid leaves the vane.

Most of the gas in the known inlet device flows across the end rim of the vane, which is vertical when the main gas flow is generally horizontal. In prior art it has been attempted to lower entrainment by placing of a vertical liquid catcher channel along the vertical trailing rim, e.g. in GB 1 119 699 and in International Patent Application publication No. WO 2005/018780. Applicant has found, however, that the presence of such vertical structures itself is a cause of re-entrainment, due to the disturbance of the gas flow by the perpendicular orientation with regard to the main direction of gas flow. Also, Applicant has found that there is an upwards force on liquid in vertical catcher channels, which can lead to liquid being pushed out of the upper part of the vertical channel and re-entrained, even though the upper end of the channel is closed.

The rim can also be a longitudinal rim, i.e. a rim substantially in the main direction of gas flow along the vanes. Cross-flow of gas over longitudinal rims can occur in the complex flow patterns that prevail in practice, in particular at high inlet velocities. For example, in the practically important case of a fluid inlet device which receives the feed mixture horizontally and introduces the separated gas and liquid streams substantially horizontally in the column, wherein the longitudinal upper and lower rims of the vanes are oriented substantially horizontally as well, gas flowing upwardly across the longitudinal rims can release some liquid from the liquid film on the vane. Relatively large liquid droplets with diameters of 0.1 to several millimetres can be re-entrained in this way by locally high gas velocities.

German Patent application No. DE 10 2004 018 341 A1 discloses a generally horizontal vane inlet device in which liquid catcher pockets are arranged along the upper horizontal rims of the vanes, which are to prevent that fluid flowing upwardly on the vanes leaves the vanes in upward direction.

Applicant has further realized that a liquid catcher channel is a suitable means for preventing re-entrainment. Liquid is caught and at least partially guided towards a side of the vane by the catcher rim, so that at least part of the gas is not cross-flowing over a rim from which liquid can be carried away. The expression liquid catcher channel is to include any means that forces liquid flow on the vane to deviate from the main direction of gas flow in the direction as defined by a channel-like structure.

Suitably the virtual line deviates from the main direction of gas flow by an angle of at most 75 degrees or less, preferably 65 degrees or less. At higher angles than 75 degrees the chance for re-entrainment by disturbance of the gas flow and/or by liquid being pushed out of the catcher channel in upward direction becomes too high. Suitably the angle is at least 10 degrees or more, preferably 20 degrees or more, more preferably 30 degrees or more such as 35 degrees or more.

Suitably at least the upstream position of the catcher channel is substantially at a rim of the vane. The upstream end can extend somewhat outside of the vane.

Preferably the liquid catcher channel extends along at least part of a rim of the vane.

In a particular embodiment the main direction of gas flow during normal operation is horizontal, and the deflecting part of the vane extends between upper and lower rims, the upstream position is at a first distance from the lower rim, and the downstream position is at a second, smaller, distance from the lower rim.

In a preferred embodiment the fluid inlet device comprises walls defining a box-like structure, wherein the liquid catcher channel is arranged on a part of the vane extending out of the box-like structure, and wherein catcher channel at its upstream position is sealingly arranged with respect to one of the walls.

Suitably the width of the deflecting part of the vane decreases in downstream direction.

In a particular embodiment a plurality of liquid catcher channels is arranged on the vane.

In a further particular embodiment two liquid catcher channels are arranged that deviate in different directions from the main direction of gas flow. This embodiment can be of particular use of the vanes in the fluid inlet device are arranged with their outlet channels opening downwardly, so that e.g. liquid can be guided by two liquid catcher channels towards the centreline of the vane.

In one type of embodiment the liquid catcher channel can extend from a first channel rim behind the convex side of the vane to a second channel rim in the plane of the deflecting part of the vane, or beyond that plane towards the concave side of the vane.

The channel rim behind the convex surface of the vane can be attached to the convex surface, in particular sealingly attached or connected.

It is also possible that the longitudinal channel rim behind the convex surface of the vane forms a slit with the convex surface. In such an embodiment, if the rim is an upper rim of the vane, the captured liquid will still be carried and discharged along the channel, but gas can escape downwardly through the slit. If the rim is a lower rim, a slit can provide an overflow outlet in cases where the liquid catcher channel could be filled full with liquid.

In another type of embodiment the liquid catcher channel is connected to or integrally formed with the rim of the vane.

Suitably also, the liquid catcher channel has a downstream end that extends until the downstream end of the trailing end of the vane, or beyond the trailing end of the vane. By extending the liquid catcher channel beyond the vane the liquid can be guided into an area where the gas velocities are much smaller. The downstream part of the liquid catcher channel can also be arranged to alter the direction of liquid release into the vessel. For example, when the main flow direction in the fluid inlet device is horizontal, the downstream part can be directed downwards, albeit suitably not abruptly.

The channel can in particular be formed by an angled profile, e.g. of an inverted L, V or U shape. Another possibility is that the channel has the shape of a tubular section, which is a tubular of which a longitudinal part has been cut out along its length.

In a fluid inlet device according to the invention the deflecting part of at least one of the vanes can also have a longitudinal rim which is provided with a liquid catcher channel.

The fluid inlet of the invention can also have at least two ladders of vanes stacked one above the other, wherein a liquid catcher channel is arranged along at least one of the lower rim of an upper vane, the upper rim of the vane below.

The fluid inlet device in accordance with the invention can be used as fluid inlet device into a gas-liquid contacting vessel, in particular into a distillation column, more in particular a high-vacuum distillation column, or into a separation vessel.

The invention further provides a method of retrofitting a fluid inlet device suitable for introducing a mixture of liquid and gas into a vessel, which fluid inlet device comprises an inlet flow channel having an inlet end for receiving the mixture of liquid and gas; and a plurality of curved guiding vanes placed one behind the other along the inlet flow channel, wherein each vane comprises an intercepting part extending towards the inlet end of the inlet flow channel, and an outwardly directed deflecting part defining a generally convex side and a generally concave side of the curved vane, wherein the deflecting parts of two consecutive vanes form an outlet channel of the inlet device and define a main direction of gas flow in the outlet channel, which method comprises providing at least one of the vanes with a liquid catcher channel extending from an upstream position with respect to the vane to a downstream position, and wherein a virtual line along the vane between the upstream position and the downstream position deviates from the main direction of gas flow.

Suitably this is done by connecting to the vane a vane end part wherein at least part of the liquid catcher channel is arranged on the vane end part.

The invention further provides a plurality of liquid catcher channels arranged for being mounted on vanes of an existing fluid inlet device, in method of retrofitting of the invention.

BRIEF DESCRIPTION OF THE DRAWINGS

The invention will now be described in more detail and with reference to the accompanying drawings, wherein.

Where the same reference numerals are used in different Figures, sometimes with addition a character a, b, c, d, e, they refer to the same or similar objects.

DETAILED DESCRIPTION OF THE DRAWINGS

Figure 1:
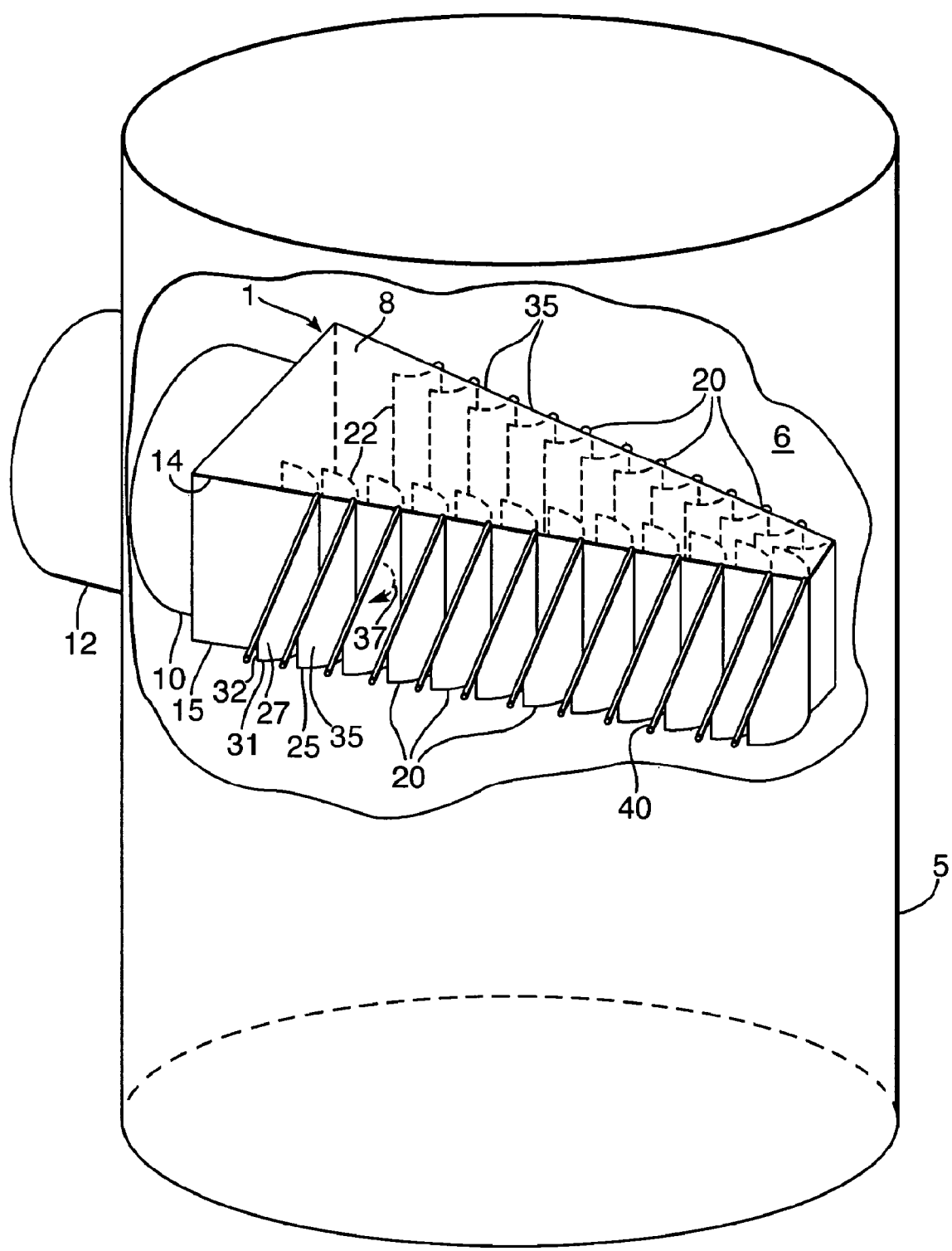
FIG. 1 shows schematically a fluid inlet device in a vertical column.

Reference is made to FIG. 1 showing schematically a fluid inlet device 1 mounted in a vertical column 5, and serves to introduce a liquid/gas mixture pre-separated and relatively evenly distributed over the cross-section into a treatment zone 6 of the column.

The fluid inlet device 1 comprises an elongated inlet flow channel 8 having an inlet end 10 in fluid communication with an inlet nozzle 12 of the column 5, through which a mixture of liquid and gas can be received. The inlet flow channel of the shown embodiment extends horizontally in the vertical column 5 between upper and lower wall plates 14,15. Curved guiding vanes 20 are placed one behind the other in two rows at either lateral side along the inlet flow channel 8, so that a box-like arrangement is obtained two sides of which are provided with a series of vanes. Each vane comprises an intercepting part 22 extending towards the inlet end 10 of the inlet flow channel, and an outwardly (out of the fluid inlet device into the vessel interior) directed deflecting part 25 having a trailing end 27 extending between an upper rim 30 and a lower rim 31 to a trailing rim 32. The trailing end is generally that downstream part where the majority of fluid separation has taken place, often it is the part extending out of the box-like structure defined by the walls 14,15.

The deflecting parts 25 define a convex and a concave side of each vane. The concave side in FIG. 1 is generally the side facing the inlet end of the fluid inlet device. The deflecting parts 25 of two consecutive vanes 20 form an outlet channel 35 of the inlet device. The outlet channel defines a main direction of gas flow 37 along the vanes, which is in the horizontal plane in the inlet device as shown. The leading and trailing ends of a vane can be planar, but each or both of them can also be curved.

The expression "main direction of gas flow" as used herein denotes the direction the gas flow will have during operation along the concave side of the vanes, when the fluid inlet device is placed in a large open space, such that the path of the outflowing gas and liquid is not influenced by surrounding equipment. It will be clear that during operation in a vertical column the direction of gas flow in the outlet part of the vane may already be influenced by the pressure distribution in the column and the presence of a nearby column wall, typically the gas does not leave horizontally but with an upward velocity component, which will depend on the precise location of the vane in the column and on operating parameters.

The arrow 37 also generally indicates the downstream direction for a particular vane.

Examples of liquid catcher channels in accordance with the invention are generally indicated with reference numeral 40 in FIG. 1, and will be discussed in more detail with reference to FIGS. 2-8.

Other internals (not shown) can be arranged in the column 5 according to the specific application. In the case of a separation column, a one or more coalescing devices like a wiremesh, vane pack, and/or a centrifugal liquid separator can be installed, e.g. in an configuration known from European Patent No. EP 0 195 464 B1.

In the case of installing the fluid inlet device in a high vacuum column, it can be installed underneath a wash bed.

During normal operation of the fluid inlet device 1 a mixture of gas and liquid is supplied through the inlet nozzle 12 via the inlet end 10 into the generally horizontally extending channel 8. Each of the vanes 20 intercepts part of the feed stream and deflects it laterally outwardly. The first vane on either side, i.e. the one nearest the inlet end 10 is so arranged in the mixed feed stream that it intercepts and deflects part of the latter, while the remaining part of the feed stream continues along the inlet channel 8. This remaining part meets successively the subsequent vanes each of which intercepts and deflects a portion of the feed stream; the leading edge of each subsequent vane is offset from the one before so that the stream becomes steadily smaller until it is finally caught and deflected by the last vanes.

Since the vanes have a curved shape the consequence of the inertia and centrifugal force is that the liquid particles strike the vane surface, and that a separation between liquid and vapour is simultaneously effected. The liquid collects to a considerable liquid stream on the concave surface of the vanes.

In the bilaterally operating embodiment shown in FIG. 1 the main flow direction of gas is generally in the horizontal plane.

Figure 2:
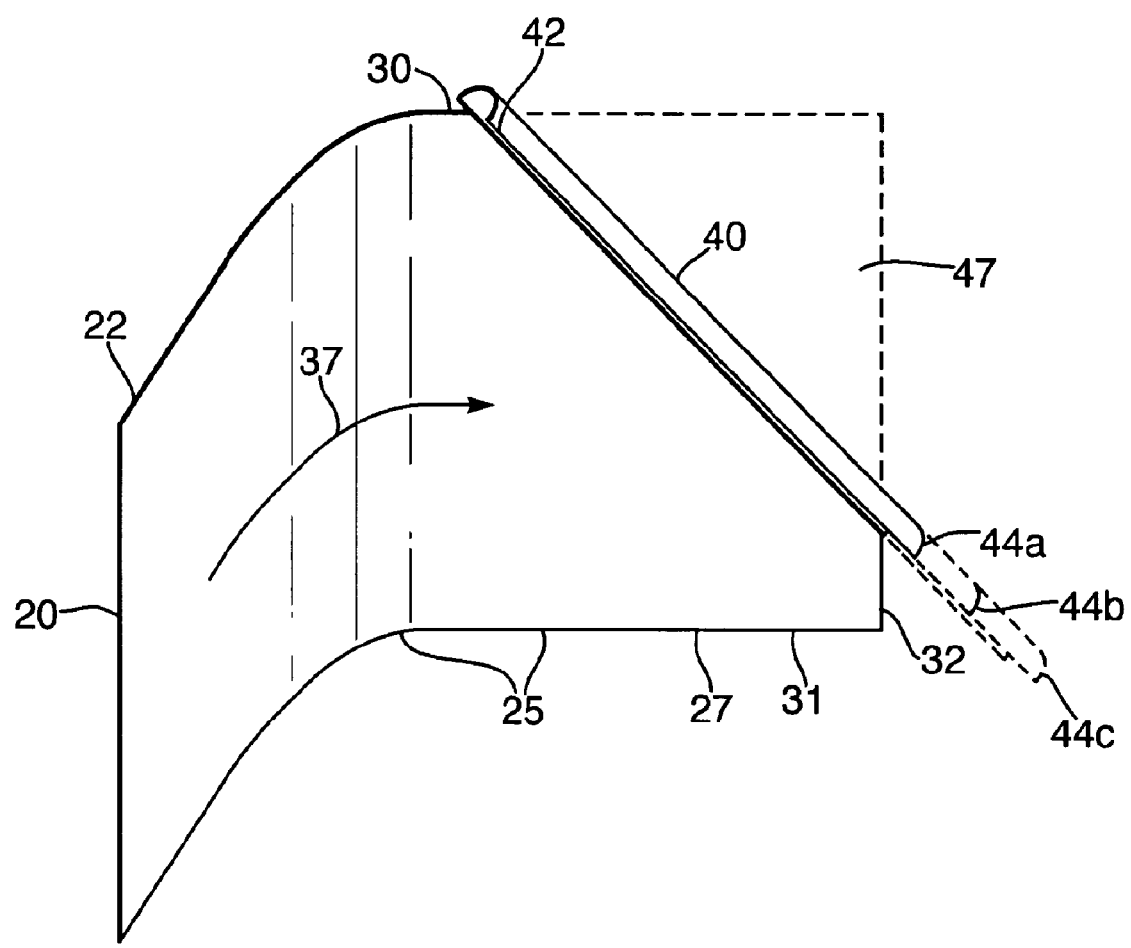
FIGS. 2-4 show schematically several embodiments of a vane in accordance with the present invention.

Reference is made to FIG. 2, showing an embodiment of a vane 20 in accordance with the present invention, in a perspective view onto the concave side of the vane.

The vane 20 has a straight intercepting part 22 and a deflecting part 25 comprising a curved part and a straight trailing end 27. The radius of curvature is generally chosen in dependence on the size of the inlet nozzle. The angle between upstream and training end is typically between 70 and 110 degrees, preferably between 80 and 100 degrees such as substantially 90 degrees. The liquid catcher channel 40 extends from an upstream position 42 on the vane 20, at the upper rim 30 thereof, to a downstream position 44a at the trailing rim 32. Upstream and downstream positions are separated along the main direction of gas flow 37. The channel can also extend over the trailing rim as indicated with dashed lines, to a downstream position 44b, which can even be located below the lower rim 31 as shown at 44c. The end part that extends over the trailing rim can also be partly curved, and/or guide the liquid out of the plane of the trailing end of the vane. Laterally further away from the fluid inlet device, local gas velocities are lower so that the chance of re-entrainment at that point is further minimized. The section extending beyond the trailing rim 32 of the vane is suitably formed by a fully enclosed tubular having an outlet at its end, but can of course also be left partly opened such as at its lower side. Bending of the part extending over the trailing rim such as downward bending can be of advantage at vanes ending close to the column wall, to suppress a mechanism of re-entrainment due to the impact of the liquid stream at high velocity onto the column wall.

The corner part 47 of the vane above the liquid catcher channel is preferably cut off, and therefore drawn with dashed lines, and in that case the liquid catcher channel runs along the upper rim of the vane. The width of the deflecting part of the vane then also decreases in downstream direction. The corner part 47 can however also remain in place.

The upstream position 42 is at a first distance from the lower rim 31, wherein distance is measured perpendicular to the direction 37. The downstream position is in all cases 44a,b,c at a smaller, distance from the lower rim, wherein it will be clear that a negative distance as in the case of position 44c is also a smaller distance.

In any case a virtual line along the vane between the upstream position 42 and the downstream position 44a,b,c deviates from the main direction of gas flow which is generally parallel with the lower rim 31.

The angle between the main direction of flow 37 and the virtual line, which is parallel with the straight liquid catcher channel 40 shown in FIG. 2, is suitably 10 degrees or more, preferably 20 degrees or more, such as 30 degrees or more, e.g. 45 degrees. The angle is suitably not larger than 75 degrees, preferably 65 degrees or less, such as 60 degrees or less.

Figure 3:
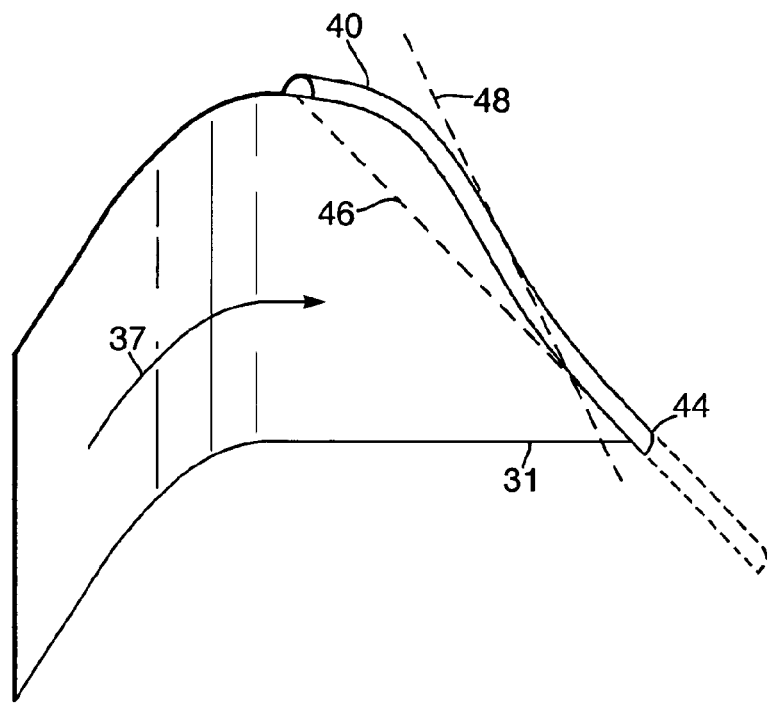

FIG. 3 shows an embodiment in which the catcher channel 40 is curved. The virtual line 46 is indicated. Preferably also the maximum angle formed by a tangential 48 of the curved catcher channel with the main flow direction 37 is suitably 10 degrees or more, preferably 20 degrees or more, such as 30 degrees or more, e.g. 45 degrees. The angle is suitably not larger than 80 degrees, preferably 75 degrees or less, more preferably 65 degrees or less, such as 60 degrees or less.

Another aspect of the embodiment of FIG. 3 is that the downstream position 44 of the catcher channel is on the lower rim 31, such that there is no finite end rim as shown at 32 in FIGS. 1 and 2. This aspect can of course also be applied in other embodiments such as that of FIG. 2.

Figure 4:
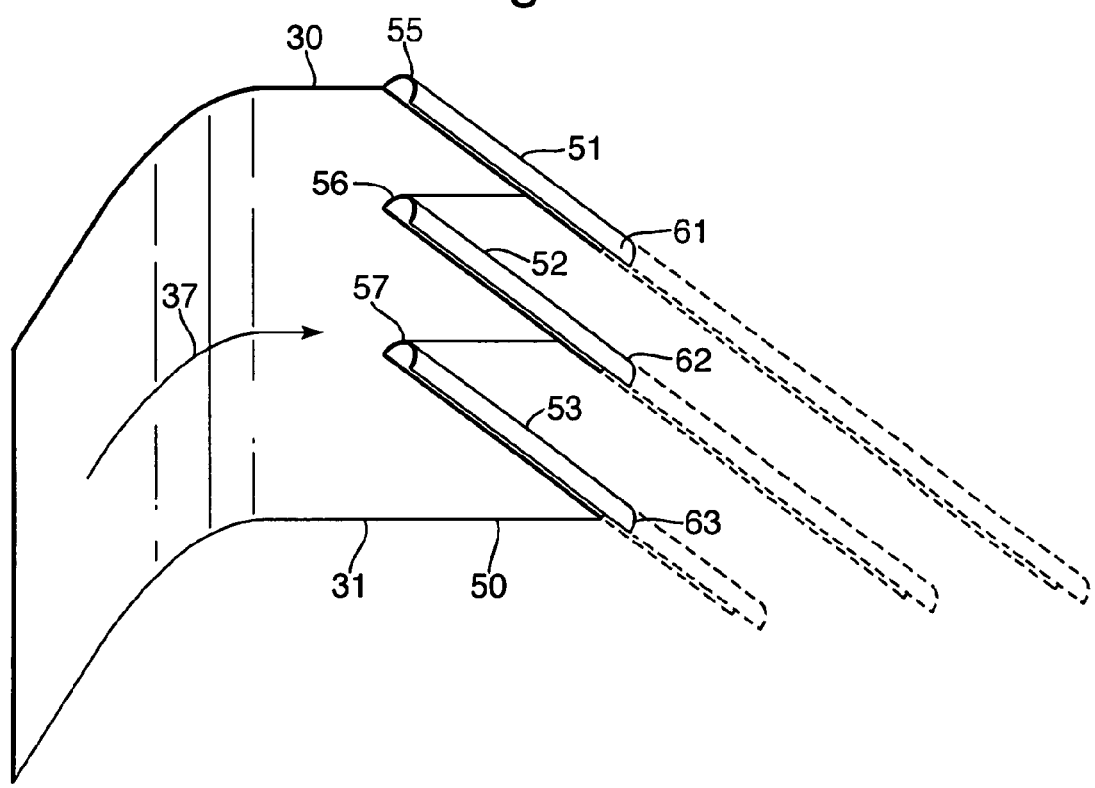

FIG. 4 shows another embodiment of a vane 50 according to the invention. If the vane is relatively high, there can be insufficient room to place catcher rims according to the invention on the vane at an angle that is not too steep. In this case, more than one catcher rim can be arranged, e.g. 2,3, 4 or more. In the example of FIG. 4, three catcher rims 51,52,53 are shown, extending from upstream positions 55,56,57 to downstream positions 61,62,63. The upstream position of the highest catcher rim is at the upper rim 30 of the vane 50. Catcher channels overlap in the main direction of gas flow 37, such that the upstream position 56 of rim 52 is higher than the downstream position 61 of rim 51, and the upstream position 57 of rim 55 is higher than the downstream position 62 of rim 52. The generally triangular parts of the vane that are in the shadow of the catcher rims can be cut out as shown, but can also be present. The dashed lines beyond the downstream positions indicate that the catcher channels can be extended, as already discussed with reference to FIG. 1, for example such that they all release the liquid at the same vertical height, if the distance to the column wall permits. The channels and/or the possible end parts beyond the end of the vane do not necessarily need to run parallel as shown, and can be at least partly curved.

Fluid inlet devices sometimes comprise two or more stacked rows of curved vanes, for example in a so-called dual (or multiple) ladder configuration. This is typically done when otherwise the vanes would become too big for passing through a manhole for installation in a column. If vanes of different ladders in such a stack are provided with catcher channels according to the invention, a configuration similar to that of FIG. 4 is obtained.

Figure 5:
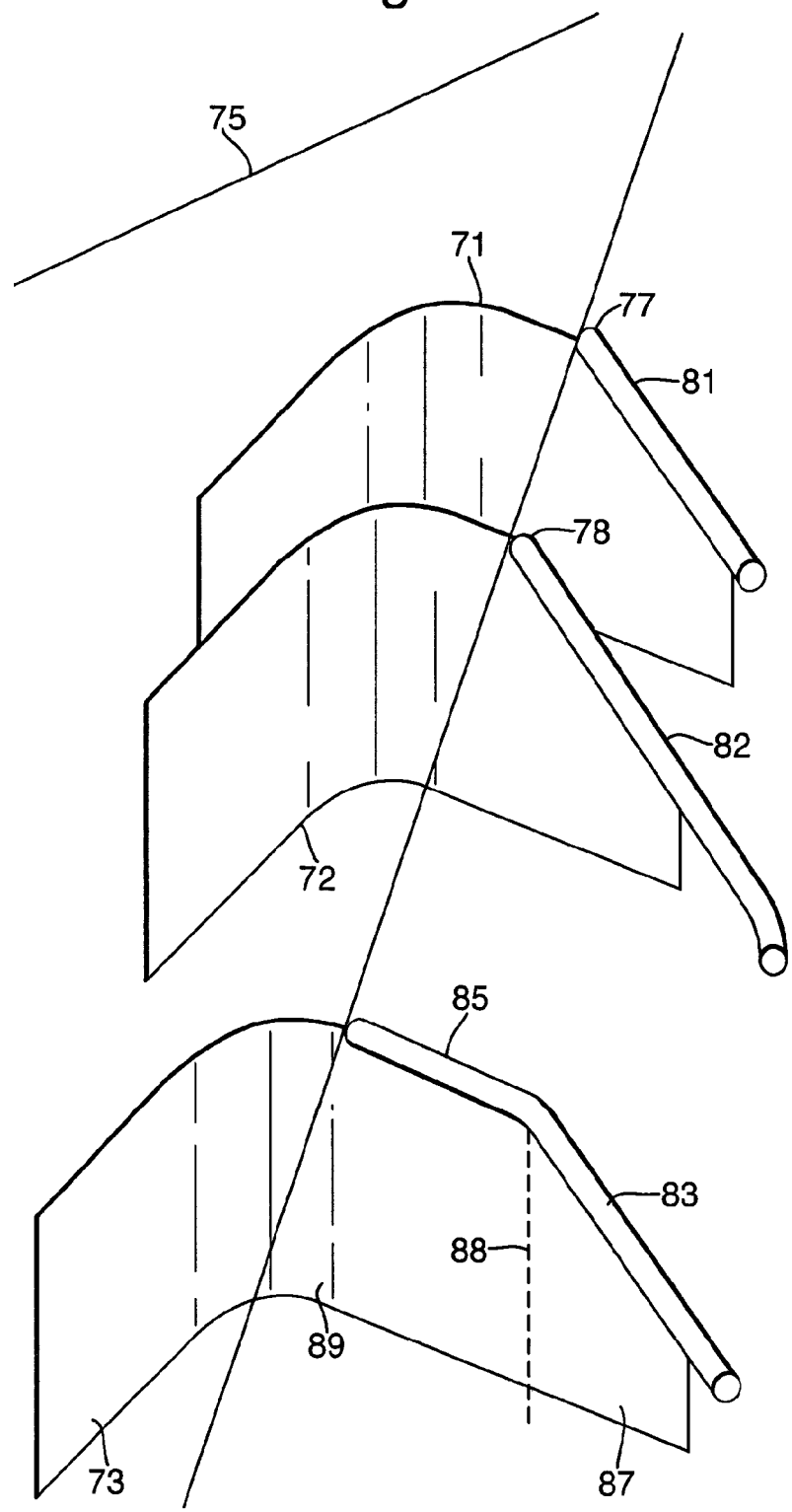
FIG. 5 shows schematically several vanes in accordance with the present invention together with a wall of the fluid inlet device.

Reference is now made to FIG. 5, showing schematically three curved vanes 71,72,73 mounted underneath a top wall plate 75 of a fluid inlet device. The upstream ends 77,78 of the catcher rims 81,82 of vanes 71,72 are arranged at the rim of the top plate 75. Preferably there is no passage for liquid from the vane between the top plate and the catcher channel. Suitably the upstream ends 77,78 are sealingly connected or attached to the top plate. In particular, the upstream end can be arranged under the top plate (including under a horizontal extension to the top plate), e.g. by cutting off the vane a little more to the inside and arranging the upstream end such that it fits against the top plate and can be welded thereto.

In vane 73 the catcher rim also extends from the position where the upper rim of the vane extends out of the top plate 75. The first part 85 of the catcher channel runs along the upper longitudinal rim of the vane 73, generally horizontal, before the catcher channel bends downwardly. The first part 85 can also be a separate conduit, or can be left out.

The end part 87 of the vane 83 beyond the dashed line 88 can be an extension of the vane 73 that is not integrally formed with the vane but connected to the upstream part 89. Such an end part can for example be mounted in the course of retrofitting an existing fluid inlet device in order to adapt/improve its performance. Connection can take place by any suitable method, e.g. welding. An upper longitudinal rim part 85 can also be mounted if desired. Alternatively, retrofitting can also be done by placing catcher rims on the existing vanes, suitably after cutting off corners.

Figure 6:
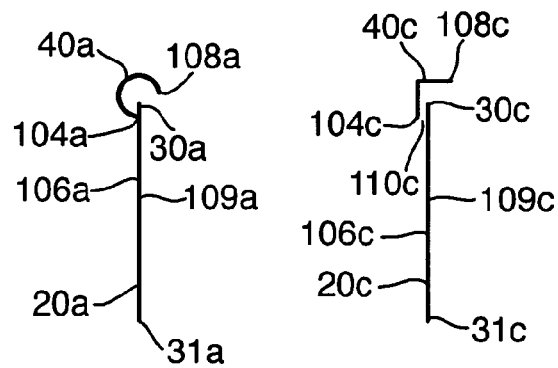
FIG. 6 shows schematically a cross-section through the trailing part of two vanes according to the invention.

Reference is now made to FIG. 6 showing a cross-section of two embodiments of vanes 20a and 20c through their respective trailing ends looking in upstream direction. Reference numerals introduced with reference to FIG. 1 are used accordingly. FIG. 6 illustrates a number of aspects of various embodiments of liquid catcher channels according to the invention.

Liquid catcher channel 40a is formed by a tubular section that extends from a first longitudinal channel rim 104a attached to the convex side 106a of the vane, to a second longitudinal channel rim 108a located beyond the upper rim 30a towards the concave side 109a, i.e. beyond the plane defined by the trailing end 27 of the curved vane.

Liquid that will be flowing along the main direction of gas flow will be catched in the channel and guided towards the downstream end of the liquid catcher channel 40a, and in this way the re-entrainment is suppressed.

The liquid catcher channel 40c is formed by an angled profile instead of a tubular section. The longitudinal channel rim 44c behind the vane is not connected to the convex surface 46c, so that a slit 110c is formed. The liquid catcher channel of this embodiment also catches the liquid, but gas can escape through the slit 110c downwardly.

It will be understood that the variants of liquid catcher channels shown at the upper rims can analogously be applied at rims having another orientation in the column. In addition to catcher channels that according to the invention are inclined with respect to the main direction of gas flow, also other catcher channels can be arranged, such as catcher channels that run longitudinally along, at least part of, an upper or a lower rim, generally parallel with the main direction of gas flow.

Although not shown in any of the Figures it is also possible that the liquid catcher cannel has its downstream end before the downstream end of the vane. This can for example be sufficient when the trailing end of the deflecting part of the vane extends far into the vessel, where the gas velocities are sufficiently low already upstream of the trailing rim of the vane.

Figure 7:
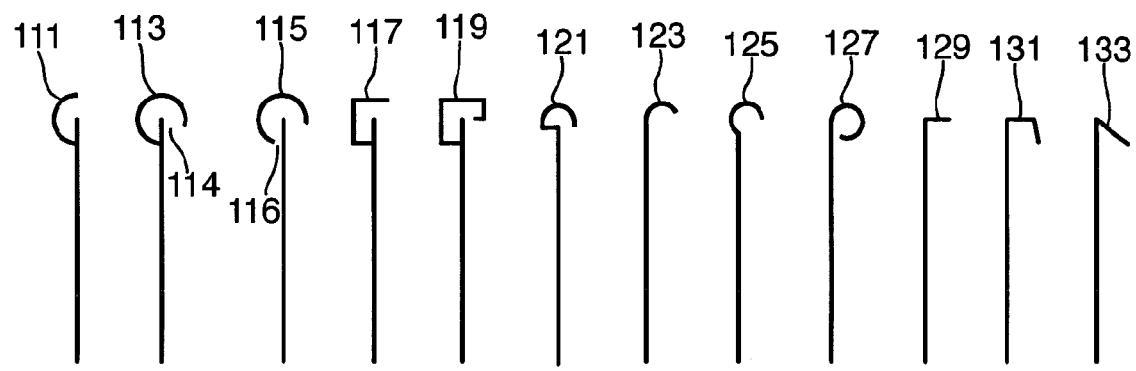
FIG. 7 schematically shows cross-sections through the trailing part further vanes according to the invention.

Reference is made to FIG. 7 showing schematically a number of further embodiments of liquid catcher channels in a cross-section equal to that of FIG. 3.

Liquid catcher channel 111 is formed by a tubular section, generally similar to 40a, but the channel does extend until the plane defined by the trailing edge of the vane, and not over the longitudinal rim of the vane towards the concave side thereof.

Liquid catcher channel 113 on the other hand extends so far towards the concave side of the vane that only a relatively small inlet slit 114 is obtained.

Liquid catcher channel 115 is formed of a tubular section, however not connected, at least not over the entire length, to the convex surface of the vane so that a slit 116 is formed, similar in function to slit 110c.

Liquid catcher channels 117 and 119 are formed of angled profiles and are sealingly attached to the convex side of the vane.

Liquid catcher channel 121 is formed of an L profile to which a half circular tube section is connected.

It shall be understood that also in cases wherein the liquid catcher channel (tubular, angled profile or other) is connected to the convex surface of the vane, separate gas outlet openings can be arranged in the lower part of the channel behind the convex side if desired.

The liquid catcher channels 123, 125, 127, 129, 131 and 133 are all formed integrally with the vane, which can allow efficient and cost-effective manufacturing.

Preferably the intercepting part of each vane makes an angle with the direction of the main direction of flow through the inlet end. Suitably the angle is 10 degrees or less.

It will depend on specific aspects of a practical situation which type of liquid catcher channel will be selected.

In general the mutual distance between the vanes, measured on their outlet ends is preferably kept within certain limits. This distance is preferably not less than 5 cm and not more than 60 cm, for example approximately 10 cm or approximately 40 cm.

The maximum height (or width) of the vanes is selected according to the size of the inlet nozzle of the vessel, and is typically in the range of 10-80 cm. For larger inlet nozzles, dual or multiple vane ladders can be stacked as discussed above.

The selected size of the liquid catcher channel will depend mainly on the amount of liquid to be transported, which is particularly dependent on the inlet height of the vane. In the channels according to the invention in many cases the majority of liquid separated on the vane will have to be transported away, and the channel needs to be dimensioned for that. A typical dimension of the channel such as diameter of a tubular section or width or height of an angled profile will typically be in the range of 3 to 50 mm, suitably 5 to 30 mm, in particular in the range of 5 to 20 mm. Placing a channel at a rim as discussed hereinabove has the advantage that part of the channel can easily be arranged at the convex side of the vanes, where the channel least disturbs the gas flow, so that its extension towards the concave side, where the highest gas velocities prevail, can be minimized.

The liquid catcher channel has an inlet opening for liquid, preferably in the form of a longitudinal slit along the respective longitudinal rim of the vane, which inlet opening suitably has width of between 1 and 20 mm, preferably between 1 and 12 mm, more preferably between 2 and 10 mm.

The embodiment schematically shown in FIG. 1 is a typical arrangement for a vane-type fluid inlet device. However, apart from the type of fluid inlet device depicted in FIG. 1, fluid catcher channels according to the invention can also be applied to other types such as an embodiment as discussed with reference to FIGS. 1-3 of GB 1 119 699. In this embodiment the vanes are arranged in such a way that they all deflect the mixture feed stream to one side, the space on the other side of the vanes being bounded by a wall which is connected to the side walls so that a box-like arrangement is obtained, one side of which is formed by a series of vanes. The series of vanes can in this case have a downwards direction, so that the liquid phase flows down in a number of streams onto a tray below, or collects directly in the bottom part of the column. It is observed that FIGS. 4 and 5 of this GB patent specification are of the general type of present FIG. 1, however without fluid catcher channels according to the present invention.

Figure 8:
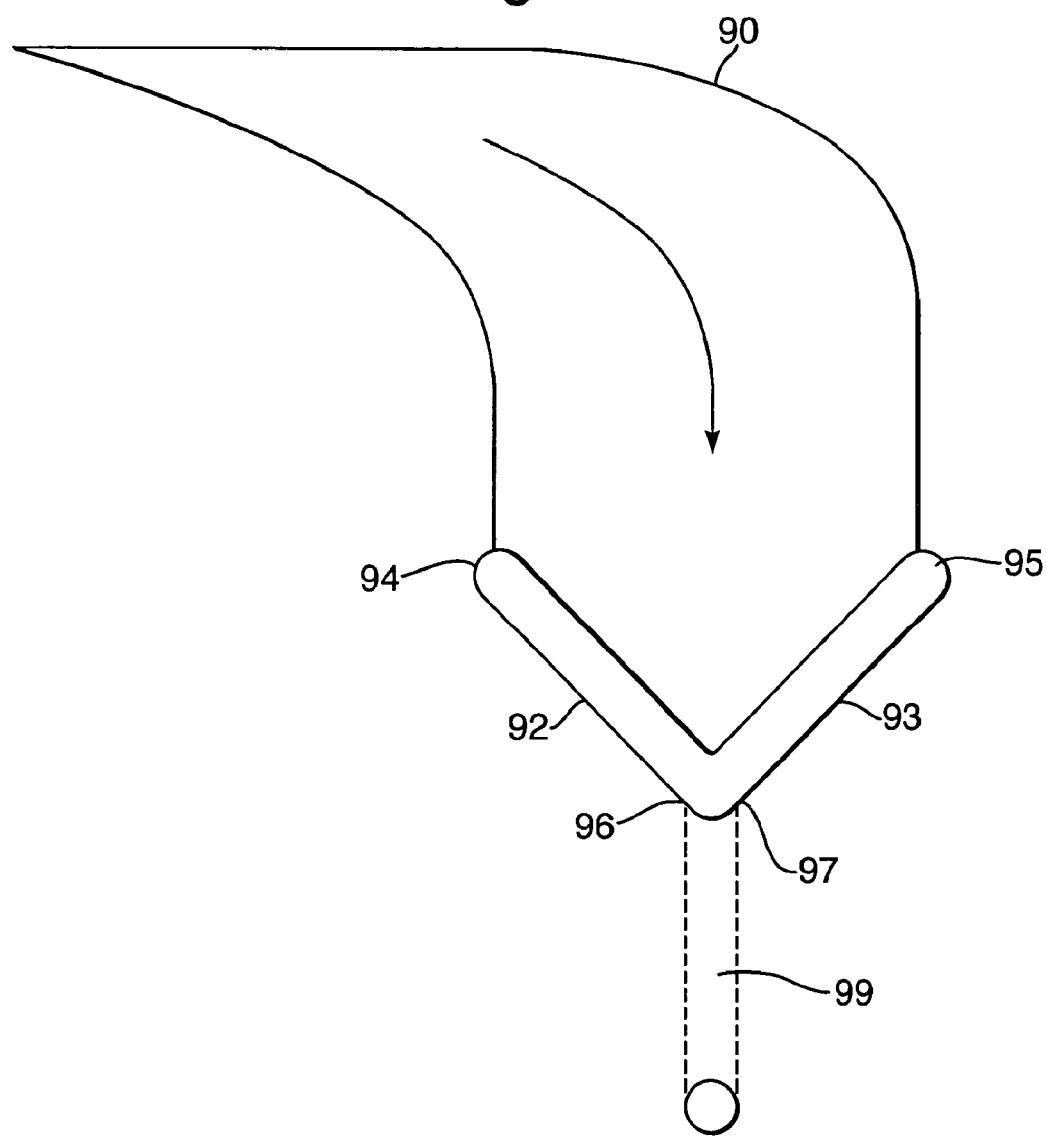
FIG. 8 schematically shows a further embodiment of a vane in accordance with the present invention.

Reference is now made to FIG. 8 showing a further embodiment of a vane in accordance with the invention. The vane 90 is particularly suitable for a downwards blowing fluid inlet device.

The vane 90 is provided with two catching channels 92, 93, extending from two upstream positions 94, 95, to downstream positions 96, 97, which in the example as shown nearly coincide. It is moreover possible to arrange a common liquid guidance channel 99 as indicated, which can be straight as shown or curved towards a suitable outlet position. Analogously to the discussion with reference to FIG. 5 the upstream ends are preferably sealingly connected or attached to the walls/plates (not shown) defining the inlet channel.

Liquid catcher channels can be made from any suitable material, suitably from the same metal as the vane, and can be connected to or integrated with the vane using known techniques including welding, bolting, bending.

By reducing the amount of entrained liquid carried upwards with the gas in accordance with the present invention, the separation duty on the internals above is minimized.

The fluid inlet device of the present invention can with advantage be used in a high vacuum distillation column. Typically in such columns, the feed mixture comprises 30-50 wt % of liquid. It has been found that at inlet velocities exceeding 100 m/s liquid entrainment can become large, so that the relative fraction of the total liquid entering the fluid inlet device and that is carried along with the gas upwardly exceeds 10%. At higher inlet velocities the entrainment is even higher. High entrainment figures represent a problem for the wash beds that are typically installed above the fluid inlet device. The present invention reduces the entrainment significantly.

The fluid inlet device of the present invention can also advantageously be used in a separation vessel. The better the overall separation efficiency of the inlet device, the easier the task for other separation internals in the column, such as a coalescer, mesh pad, vane pack, or centrifugal liquid separator (swirl deck, cyclone, multicyclone). This will allow to relax design criteria for such other internals and/or allow higher throughput and/or allow to build smaller and/or cheaper separators.

The vessel can be a vertical column, but also another type of vessel.

EXAMPLE

A fluid inlet device was tested before and after retrofitting with liquid catcher channels in accordance with the invention. The fluid inlet device was horizontally mounted in a column of 1 m diameter, generally as shown in FIG. 1, but in a dual ladder configuration with 28 vanes in total, 14 vanes on either side arranged in two stacked rows of 7 vanes each. Each vane was 0.144 m high, and the feed pipe to the column inlet had a diameter of 0.28 m.

The fluid inlet device was tested before mounting of liquid catcher channels. A water/air mixture was fed to the feed pipe in which the water was dispersed in the air as droplets with a size as is typically present in transfer lines to high vacuum units. Tests were conducted over a range of air inlet velocities of 30-60 m/s, and using a water to air mass ratio of 0.3.

The amount of entrainment in the gas was determined by using a vanepack mounted above the vane inlet device. The water caught in the vanepack was drained and the amount was measured. Entrainment can be defined as the weight of liquid recovered by the vane pack per volume of gas.

Then the fluid inlet device was equipped with triangular vane end parts as in 87 (FIG. 5) with an equal height and length of 0.144 m, so that a rim at 45 degrees with the horizontal main direction of gas flow was obtained. Along this rim a catcher channel 83 was arranged, thereby also having a 45 degrees angle with the main direction of gas flow. The length of the channel part 83 was 0.22 m. The channel extended further along the horizontal upper rim of the original vane to the top wall plate of the fluid inlet device, as shown with reference numeral 85 in FIG. 5.

The catcher channel had a shape 121 as shown in FIG. 7. The diameter of the half circular tubular in top was 10 mm. The size of the slit on the concave side of the vane between the upper rim of the vane and the rim of the channel was 3 mm.

Tests performed after installation of the catcher channels in accordance with the invention, using otherwise identical conditions, showed that the entrainment was reduced by a factor 2 to 3 over the range of air inlet velocities.

As already discussed, other catcher channels can be arranged, such as catcher channels that run longitudinally along, at least part of, an upper or a lower rim, generally parallel with the main direction of gas flow. These can be installed in addition to, or even instead of, catcher channels that are inclined with respect to the main direction of gas flow, such as for example on particular vanes of the inlet device where installation of inclined catcher channels by retrofitting is not possible, but where retrofitting of longitudinal channels is possible.

A particular situation where such longitudinal catcher channels are useful is in so-called dual (or multiple) ladder vane inlet devices. These which are generally similar to that shown in FIG. 1, but two (or more) ladders or layers of vanes are stacked one above the other. This is typically done when otherwise the vanes would become too big for passing through a manhole for installation in a column. For example, the vane of FIG. 4 could be formed of three stacked vanes each having one inclined catcher channel 51,52,53.

In a dual or multi-ladder vane inlet device, higher mounted vanes will experience upward cross-flow at their lower longitudinal rims from gas exiting the lower vane ladder. A liquid catcher channel at the lower longitudinal rim of an upper vane will collect liquid at the lower rim, and at the same time shield the lower rim from upward flowing gas, so that the chance for re-entrainment is minimized. Also at the lowest longitudinal rim of a vane inlet device a liquid catcher channel can prove beneficial.

Figure 9:
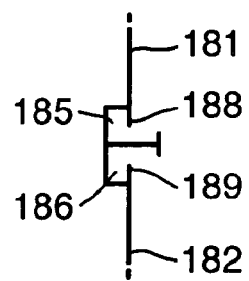
FIG. 9 schematically shows a special embodiment of a liquid catcher channel.

Clearly, in a dual or multiple ladder arrangement the lower rim of an upper vane and the upper rim of the vane below can both be provided with a liquid catcher channel. In a special embodiment the two neighbouring longitudinal channels can be connected or integrated with each other, which is useful when there is little space available between the vanes. A special embodiment of this is schematically shown in FIG. 9, wherein a cross-sectional view as in FIG. 6 of the trailing ends of the lower part of an upper vane 181 and the upper part of a lower vane 182 are shown, and wherein one possible embodiment of combined liquid catcher channels 185,186 for the lower rim 188 of the upper vane and the upper rim 189 of the lower vane respectively is shown.

Accordingly there is also provided a fluid inlet device suitable for introducing a mixture of liquid and gas into a vessel, which fluid inlet device comprises an inlet flow channel having an inlet end for receiving the mixture of liquid and gas; and a plurality of curved guiding vanes placed one behind the other along the inlet flow channel, wherein each vane comprises an intercepting part extending towards the inlet end of the inlet flow channel, and an outwardly directed deflecting part having a trailing end extending between longitudinal rims, wherein the curved vane has a generally convex side and a generally concave side, wherein the deflecting parts of two consecutive vanes form an outlet channel of the inlet device, and wherein at least one of the vanes is provided along at least part of one or both longitudinal rims of its deflecting part with a liquid catcher channel.

High supply velocities can be a significant mechanism of re-entrainment of already separated liquid into gas occurs at the longitudinal rims of the vane, in particular at the trailing end of the deflecting part of the vane. The expression longitudinal is used here to refer to a direction substantially in the main direction of fluid flow along the vanes, typically horizontal during normal operation in a device of the orientation as in FIG. 1.

Such a catcher rim suppresses re-entrainment caused by gas flowing at an angle across a longitudinal rim.

Figure 10:
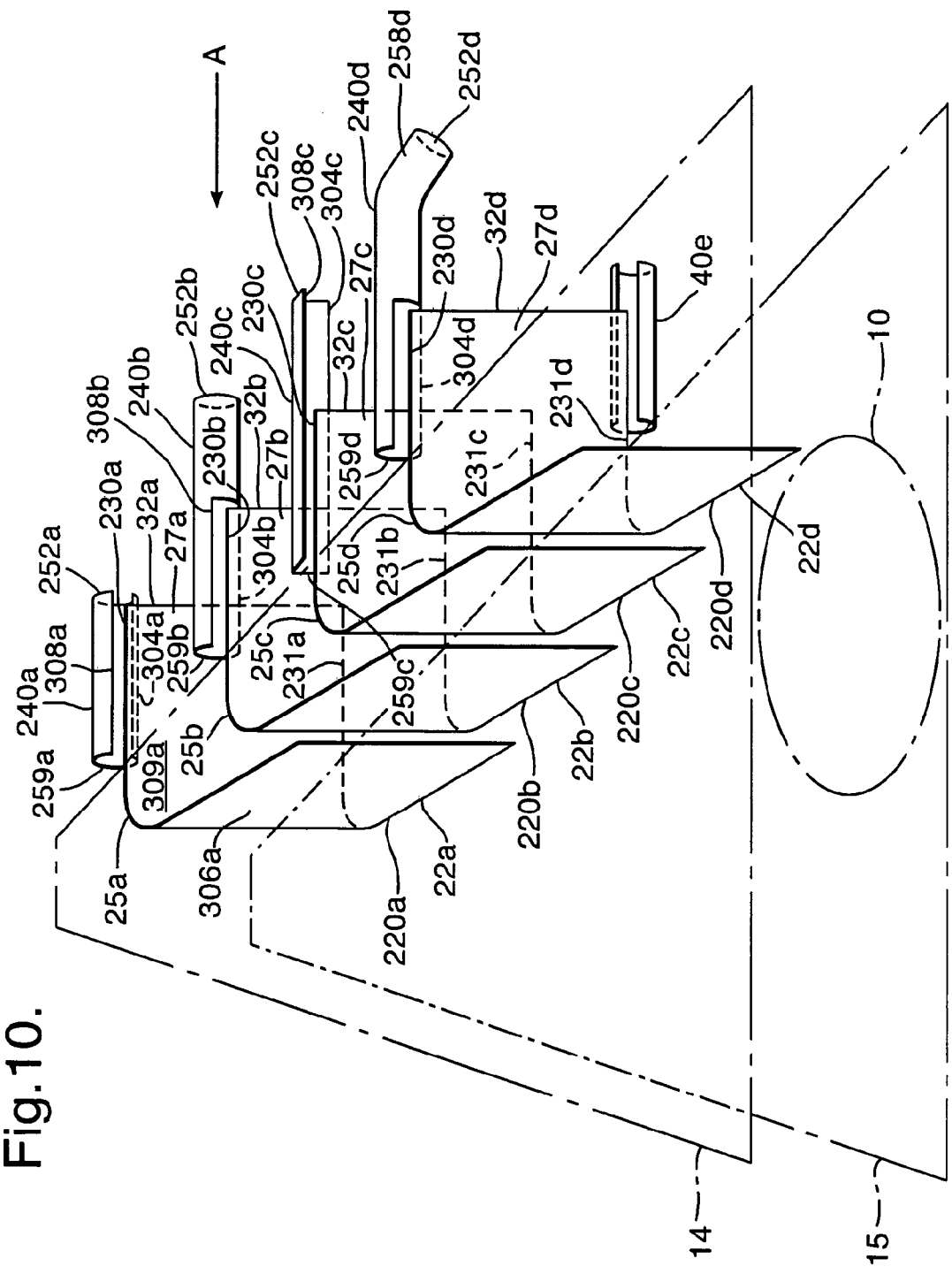
FIG. 10 schematically shows an enlarged portion of a fluid inlet device with vanes.

Reference is now made to FIG. 10. FIG. 10 shows schematically an enlarged portion of a fluid inlet device 201 with vanes 220a, 220b, 220c, and 220d shown with horizontal upper and lower rims 230a,b,c,d and 231 $a,b,c,d$ along the trailing ends 227a,b,c,d of the vanes. Device 201 is overall largely similar to the one shown in FIG. 1, but FIG. 10 illustrates on the various vanes a number of aspects of various embodiments of longitudinal liquid catcher channels 240a,b, c,d,e. FIG. 6 represents a cross-section through the trailing rims when viewed along arrow A, wherein for that purpose 200 should be added to the reference numerals in FIG. 6 to arrive at the corresponding reference numeral of FIG. 10. Further reference is made to the discussion with regard to FIG. 6 hereinbefore, which applies analogously here.

Liquid that will be taken along by gas flowing upwardly over a rim, e.g., 230a will be catched in the channel 240a and guided towards the downstream end 252a of the liquid catcher channel 240a, and in this way the re-entrainment is suppressed.

Liquid catcher channel 240b is similar except that downstream end 252b extends beyond the trailing edge 232b. Laterally further away from the fluid inlet device, local gas velocities are lower so that the chance of re-entrainment at that point is further minimized. The section extending beyond the trailing rim 232b of the vane is suitably formed by a fully enclosed tubular having an outlet 252c at its end.

The liquid catcher channel 240c is formed by an angled profile instead of a tubular section, as already discussed with regard to FIG. 6.

The liquid catcher channel 240d is also formed by a tubular section, however the part 258d extending beyond the vane is bent downwardly so as to guide the liquid into the desired direction. This can be of advantage at vanes ending close to the column wall to suppress a mechanism of re-entrainment due to the impact of the liquid stream at high velocity onto the column wall.

It will be understood that the variants of liquid catcher channels shown at the upper longitudinal rims can analogously be applied at the lower longitudinal rims, or on non-horizontal longitudinal rims of vanes of other shape or orientation in the column.

The liquid catcher channel 240e at the lower longitudinal rim of vane 220d is one example. At a lower rim, gravity drags some of the liquid downwardly over the rim. On the other hand it shall be understood that also at a lower rim there is a possibility of cross-flow of gas.

That which is claimed is:

1. In a fluid inlet device suitable for introducing a mixture of liquid and gas into a vessel, which fluid inlet device comprises:
   an inlet flow channel having an inlet end for receiving the mixture of liquid and gas; and
   a plurality of curved guiding vanes placed one behind the other along the inlet flow channel,
   wherein each vane comprises an intercepting part extending towards the inlet end of the inlet flow channel, and an outwardly directed deflecting part defining a generally convex side and a generally concave side of the curved vane,
   wherein the deflecting parts of two consecutive vanes form an outlet channel of the inlet device and define a main direction of gas flow in the outlet channel, the improvement comprising:
   providing at least one of the vanes with a liquid catcher channel at least part of which extends along a rim of the vane and which additionally extends from an upstream position with respect to the vane to a downstream position,
   wherein the rim of the vane is slanted between the upstream position and the downstream position such that the slant deviates from the main direction of gas flow by and angle of at least 10 degrees but not larger than 75 degrees.

2. The improved fluid inlet device according to claim 1, wherein the upstream position is at a rim of the vane.

3. The improved fluid inlet device according to claim 1, wherein the liquid catcher channel is curved.

4. The fluid improved inlet device according to claim 1, wherein the main direction of gas flow during normal operation is horizontal, wherein the deflecting part of the vane extends between upper and lower rims, wherein the upstream position is at a first distance from the lower rim, and wherein the downstream position is at a second, smaller, distance from the lower rim.

5. The improved fluid inlet device according to claim 1, wherein the fluid inlet device comprises walls defining a box-like structure, wherein the liquid catcher channel is arranged on a part of the vane extending out of the box-like structure, and wherein the catcher channel at its upstream position is sealingly arranged with respect to one of the walls.

6. The improved fluid inlet device according to claim 1, wherein the width of the deflecting part of the vane decreases in a downstream direction.

7. The improved fluid inlet device according to claim 1, wherein a plurality of liquid catcher channels is arranged on the vane.

8. The improved fluid inlet device according to claim 1, wherein two liquid catcher channels are arranged that deviate in different directions from the main direction of gas flow.

9. The improved fluid inlet device according to claim 3, wherein the liquid catcher channel extends from a first channel rim behind the convex side of the vane to a second longitudinal channel rim located in the plane defined by the curved vane or beyond that plane towards the concave side of the vane.

10. The improved fluid inlet device according to claim 3, wherein the liquid catcher channel is connected to or integrally formed with the longitudinal rim of the curved vane.

11. The improved fluid inlet device according to claim 1, wherein the liquid catcher channel has a downstream end that extends until the downstream end of the trailing end of the vane.

12. The improved fluid inlet device according to claim 1, wherein the deflecting part of at least one of the vanes has a longitudinal rim which is provided with a liquid catcher channel.

13. The improved fluid inlet device according to claim 1, wherein at least two ladders of vanes are stacked one above the other, and wherein a liquid catcher channel is arranged along at least one of the lower rim of an upper vane, the upper rim of the vane below.

14. A method of retrofitting a fluid inlet device suitable for introducing a mixture of liquid and gas into a vessel,
   which fluid inlet device comprises:
   an inlet flow channel having an inlet end for receiving the mixture of liquid and gas; and
   a plurality of curved guiding vanes placed one behind the other along the inlet flow channel,
   wherein each vane comprises an intercepting part extending towards the inlet end of the inlet flow channel, and an outwardly directed deflecting part defining a generally convex side and a generally concave side of the curved vane,
   wherein the deflecting parts of two consecutive vanes form an outlet channel of the inlet device and define a main direction of gas flow in the outlet channel,
   which method comprises:
   providing at least one of the vanes with a liquid catcher channel at least part of which extends along a rim of the vane and which additionally extends from an upstream position with respect to the vane to a downstream position, and
   wherein the rim of the vane is slanted between the upstream position and the downstream position such that the slant deviates from the main direction of gas flow by and angle of at least 10 degrees but not larger than 75 degrees.

15. The method according to claim 14, wherein the step of providing at least one of the vanes with a liquid catcher channel comprises connecting to the vane a vane end part, wherein at least part of the liquid catcher channel is arranged on the vane end part.

16. The improved fluid inlet device according to claim 1, wherein the slant deviates from the main direction of gas flow by an angle of at least 20 degrees and not larger than 75 degrees.

17. The improved fluid inlet device according to claim 1, wherein the slant deviates from the main direction of gas flow by an angle of at least 30 degrees and not larger than 75 degrees.

18. The improved fluid inlet device according to claim 1, wherein the slant deviates from the main direction of gas flow by an angle of at least 65 degrees and not smaller than 10 degrees.

19. The improved fluid inlet device according to claim 1, wherein the liquid catcher channel has a downstream end that extends beyond the trailing rim of the vane.

20. The improved fluid inlet device according to claim 3, wherein the maximum angle formed by a tangential of the curved liquid catcher channel with the main flow direction is 20 degrees and not larger than 75 degrees.

21. The improved fluid inlet device according to claim 20, wherein the maximum angle formed by a tangential of the curved liquid catcher channel with the main flow direction is at least 10 degrees and not larger than 75 degrees.

* * * * *